Sept. 18, 1928.
A. A. WOODWARD
1,684,463
LUBRICATION OF SINGLE SLEEVE ENGINES
Filed Dec. 29, 1926
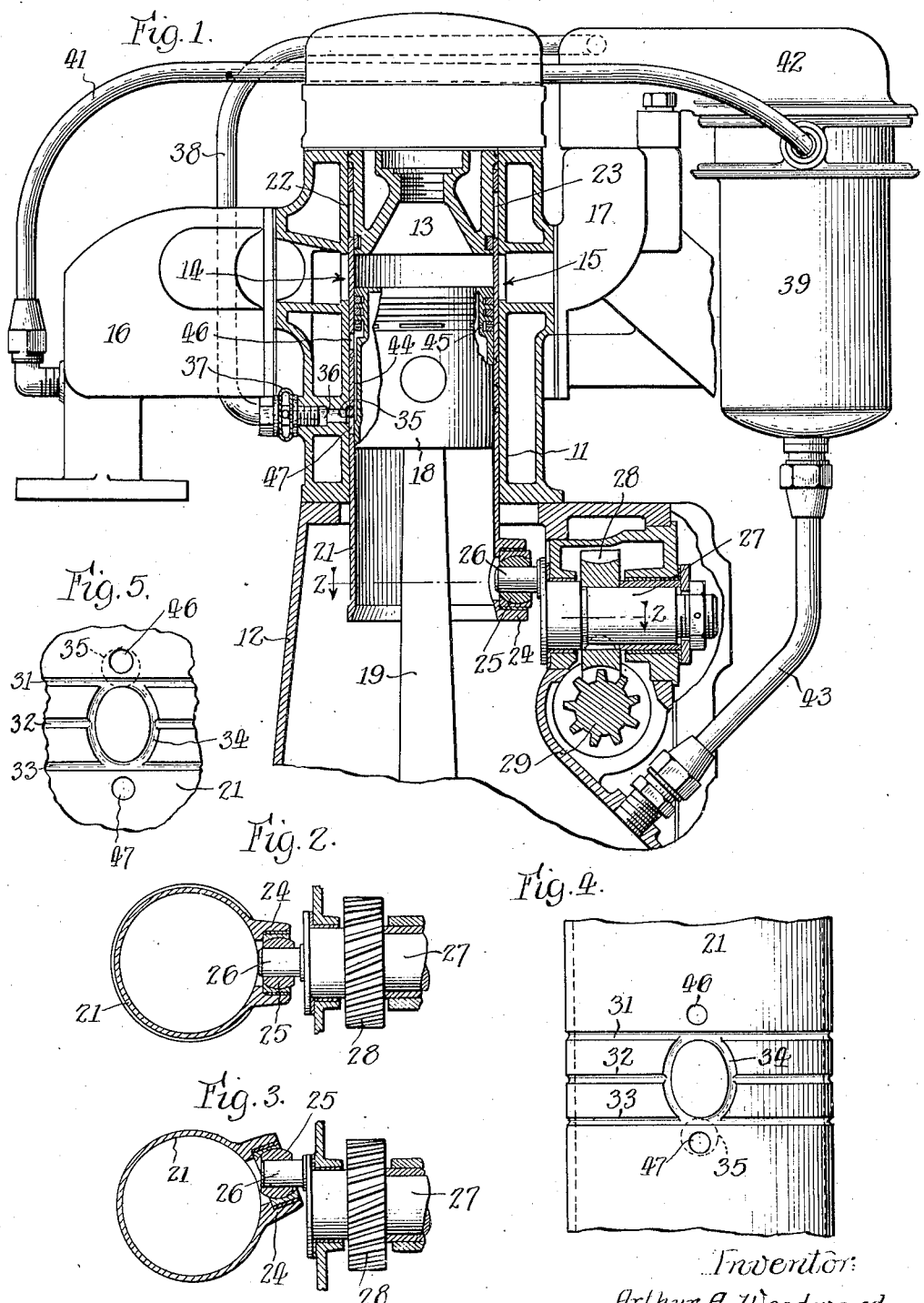
Inventor:
Arthur A. Woodward,
By Walter M. Fuller Atty.

Patented Sept. 18, 1928.

1,684,463

UNITED STATES PATENT OFFICE.

ARTHUR A. WOODWARD, OF DETROIT, MICHIGAN, ASSIGNOR TO SKINNER AUTOMOTIVE DEVICE CO., INC., OF DETROIT, MICHIGAN, A CORPORATION OF CALIFORNIA.

LUBRICATION OF SINGLE-SLEEVE ENGINES.

Application filed December 29, 1926. Serial No. 157,675.

The present invention relates to novel features of construction and function in internal-combustion engines, particularly those of the single-sleeve type wherein the movements of such sleeve control the opening and closing of the inlet and exhaust ports, the invention pertaining especially to the lubrication of an engine of this character.

In engines or motors of this style it is desirable to withdraw or remove lubricating oil from around the piston and from around the moving sleeve in order to prevent an excess of oil from reaching the firing chamber, where it becomes consumed, forming carbon, with the usual objectionable results.

The withdrawing of the oil from the sleeve prevents the engine exhaust from smoking, as otherwise the excess lubricant is likely to be drawn into or through the ports of the engine and be consumed without resulting advantage, in fact, constituting a direct economic loss.

To enable those skilled in this art to fully understand the invention, in the accompanying drawing, forming a part of this specification, a present, desirable and preferred embodiment of the invention has been presented in detail, and for simplicity like reference characters have been employed throughout the several views to designate the same parts.

In this drawing,—

Fig. 1 is a fragmentary view of a multicylinder, single-sleeve type of internal-combustion engine, one of the cylinders and associated parts being illustrated in section;

Fig. 2 is a horizontal section on line 2—2 of Fig. 1, showing the means for actuating the single sleeve;

Fig. 3 is a similar section depicting the parts in different positions;

Fig. 4 is a fragmentary elevation of the sleeve in its uppermost position; and

Fig. 5 is a similar view showing the sleeve in its lowermost position.

Referring to the drawings, it will be noted that the engine includes the water-jacketed cylinder 11, the crankcase 12, the cylinder-head 13, the inlet and exhaust ports 14 and 15, respectively, the intake and exhaust manifold 16 and 17, respectively, the piston 18 and its connecting-rod 19.

Between the piston and the cylinder-wall a single sleeve 21 is interposed, such sleeve having ports 22 and 23 governing and controlling the opening and closing of the engine intake and exhaust ports.

The lower end of such sleeve at one side is equipped with a suitable bearing 24 accommodating a partial ball member 25 adapted to rock therein and rotatable on a stud-shaft 26 mounted eccentrically on a suitably-journaled shaft 27 fitted with a worm-wheel 28 in co-operative relation with a worm 29 rotated in any approved manner at the crank-shaft speed of the engine, the construction of the parts being such that the shaft 27 and its stud 26 will be revolved at one-half crank-shaft speed.

From the above construction it will be readily understood that the sleeve slides up and down in the cylinder an amount equal to the vertical travel of the stud-shaft 26, and that the sleeve also oscillates in the cylinder an amount slightly less than the sidewise or horizontal travel of the shaft or stud 26. Such movement of the sleeve may be more or less aptly characterized as somewhat elliptical.

The ball or universal joint connection of the stud-shaft 26 with the sleeve permits the specified rocking movement of the latter, as is clearly portrayed in Figs. 2 and 3.

The sleeve is supplied with a plurality of transverse, circumferential, oil-collecting grooves 31, 32 and 33 joined together below and in alignment with the cylinder inlet-port 14 by a somewhat elliptical groove 34 corresponding in shape more or less exactly or approximately with the path of travel of the sleeve.

Directly below the cylinder fuel-intake port 14 the cylinder is supplied with a port 35 connected by a conduit 36 extended through the water-jacket and associated with a tubular manifold 37 extended along the sides of and similarly joined to the corresponding ports of the several cylinders. Such conduit is connected by a pipe 38 to one side of an oil purifier or rectifier 39 of known construction, the other side of the rectifier being joined by a pipe 41 to the intake-manifold 16, so that the rectifier and the piping system are always at sub-atmospheric pressure created by the suction present in the intake-manifold.

The upper portion of the lubricant-rectifier has a chamber 42 heated more or less by its association with the exhaust-manifold 17 whereby to facilitate the vaporization of the gasifiable, impure constituents of the oil drawn into the rectifier by means of the specified suction.

The lower part of the rectifier is equipped with an oil-delivery pipe 43 through which the reclaimed oil is returned by gravity, intermittently, under atmospheric pressure, to the engine crank-case As will be observed from Figs. 4 and 5, the port 35 is so located and of such size that it is always in communication with the oval or elliptical sleeve-groove 34 and the transverse, oil-collecting grooves connected thereto.

The result is that the suction of the intake-manifold continuously withdraws the more or less impure oil in the sleeve-grooves 31, 32, 33 and 34 through the cylinder-port 35 and into the rectifier, where it is automatically purified or rectified under the action of heat and sub-atmospheric pressure, the vapors and gases passing on into the intake-manifold for consumption in the engine, the reclaimed oil being discharged intermittently from the rectifier into the crank-case for further use.

In case the oil is not contaminated or polluted enough to require purification or reclamation, the rectifier may be omitted, with the substitution of suitable means for withdrawing the oil and returning it to the lubrication system of the engine.

In order to prevent an excess of oil from traveling upwardly into the firing chamber between the piston and the sleeve, and also to preclude the possibility of the fuel in gaseous or liquid form from flowing down from the firing chamber between the same parts into the crank-case, where it would dilute and contaminate the oil-supply therein, means are provided for withdrawing fluids from around the piston during its reciprocation, such fluids ordinarily comprising the oil charged or laden with more or less gasifiable fuel-impurities.

Accordingly, the piston employed is like that of United States Patent No. 1,502,922, Ralph L. Skinner, granted July 29, 1924, such piston having on its outer surface a longitudinal groove 44 communicating at its upper end with the lowermost piston-ring groove, behind the piston-ring therein, the groove 44 being in alignment with the cylinder-port 35.

To break the vacuum imposed on such lower, piston-ring groove and to provide for the aeration of the liquids withdrawn from such groove, the latter, diametrically opposite the groove 44, is provided with a bleeder-port 45 extended through the wall of the piston and communicating with its interior, and thereby with the crank-case.

Obviously, the contents of the piston-ring groove must be withdrawn through the movable sleeve, and accordingly the latter has two ports 46 and 47 therethrough in alignment with the port 35 and the piston-groove 44.

As the sleeve moves up and down and turns, its ports 46 and 47 alternately come into register and communicate with the cylinder-port 35, as shown in Figs. 4 and 5, and during such periods of register the suction present at the cylinder-port 35 withdraws the contents of the piston-ring groove in aerated condition, and this impure lubricant mixes with that abstracted from the sleeve, and both pass on in this condition to the rectifier, where they are purified in the manner stated above.

The cylinder, sleeve and piston may be lubricated in any approved manner, as by forced feed or by the well-known splash system, and the means afforded by this invention assures purity and proper viscosity of the oil-supply in the crank-case because it prevents pollution or contamination thereof and also avoids an unnecessary or unprofitable consumption of oil by the engine.

Many minor changes may be incorporated in the structure shown and described without departure from the heart and essence of the invention and without the sacrifice of any of its material benefits and advantages, the scope of the invention being defined by the appended claims.

I claim:

1. In an internal-combustion engine, the combination of an engine-cylinder having inlet and exhaust ports, a single movable sleeve in said cylinder controlling said ports, a piston reciprocatory in said sleeve, means to lubricate said cylinder, sleeve and piston, and means to withdraw fluids continuously from around said sleeve and intermittently from around said piston through the same cylinder port during the operation of the engine.

2. In an internal-combustion engine, the combination of an engine-cylinder having inlet and exhaust ports, a single sleeve in said cylinder controlling said ports, means to simultaneously slide said sleeve longitudinally in said cylinder and turn it about its own axis, said sleeve having oil-collecting groove means on its outer surface, means to lubricate said cylinder and sleeve, and means to continuously withdraw fluids from said sleeve-groove means during the operation of the engine at a point below and in substantial longitudinal alignment with said inlet-port.

3. In an internal-combustion engine having inlet and exhaust ports, a single sleeve in said cylinder controlling said ports, means to simultaneously slide said sleeve in said cylinder and turn it about its own axis, said sleeve having external oil-collecting groove means, an externally-grooved piston reciprocatory in said sleeve, means to lubricate said cylinder, sleeve and piston, and means below and in substantial alignment with said inlet-port to continuously withdraw fluids from said sleeve groove means during the operation of the engine and to intermittently withdraw fluids from said piston groove.

4. In an internal-combustion engine, the combination of an engine-cylinder having inlet and exhaust ports and a third port, a sleeve in said cylinder controlling said inlet and exhaust ports, means to simultaneously slide said sleeve in said cylinder and turn it about its own axis, said sleeve having oil-collecting groove means in constant communication with said cylinder third port, means to lubricate said cylinder and sleeve, and means to continuously withdraw the contents of said sleeve-groove means through said cylinder third port during the operation of the engine.

5. In an internal-combustion engine, the combination of an engine-cylinder having inlet and exhaust ports and a third port, an apertured sleeve in said cylinder controlling said inlet and exhaust ports, means to simultaneously slide said sleeve in said cylinder and turn it about its own axis, said sleeve having oil-collecting groove means in constant communication with said cylinder third port, an externally-grooved piston reciprocatory in said sleeve, means to lubricate said cylinder, sleeve and piston, and means to continuously remove the contents of said sleeve-groove means through said cylinder third port during the operation of the engine and to intermittently remove the contents of said piston groove through said cylinder third port during register of the sleeve aperture therewith.

6. In an internal-combustion engine, the combination of an engine-cylinder having inlet and exhaust ports and a third port, a sleeve in said cylinder controlling said inlet and exhaust ports, means to simultaneously slide and turn said sleeve in said cylinder, said sleeve having external oil-groove means in constant register with said cylinder third port, said sleeve having a plurality of apertures therethrough brought intermittently into register with said cylinder third port by the movement of said sleeve, an externally-grooved piston reciprocatory in said sleeve, means to lubricate said cylinder, sleeve and piston, and means to apply suction substantially continuously to said third port to withdraw therethrough the contents of said sleeve-groove means continuously and the contents of said piston-groove intermittently through said sleeve apertures.

7. In an internal-combustion engine, the combination of an engine-cylinder having inlet and exhaust ports and a third port, a sleeve in said cylinder controlling said inlet and exhaust ports, means to simultaneously slide and turn said sleeve in said cylinder, said sleeve having a circumferential oil-groove connecting with an oval groove in constant register with said cylinder third port, said sleeve having a pair of apertures therethrough beyond the ends of said oval groove and brought alternately into register with said cylinder third port by the movement of said sleeve, an externally-grooved piston reciprocatory in said sleeve, means to lubricate said cylinder, sleeve and piston, and means to remove through said cylinder third port the contents of said sleeve grooves continuously during the running of the engine and the contents of said piston groove intermittently through said sleeve apertures.

8. In an internal-combustion engine, the combination of an engine-cylinder having inlet and exhaust-ports, a single sleeve in said cylinder controlling said ports, means to simultaneously slide said sleeve longitudinally in said cylinder and turn it about its own axis, said sleeve having oil-collecting means on its outer surface, means to lubricate said cylinder and sleeve, and means at a point below and in substantial longitudinal alignment with said inlet-port to withdraw fluids from said oil-collecting means during the operation of the engine.

In witness whereof I have hereunto set my hand.

ARTHUR A. WOODWARD.